US005598972A

United States Patent [19]

Klein, II et al.

[11] Patent Number: 5,598,972

[45] Date of Patent: Feb. 4, 1997

[54] OPTICAL SPRAY PAINT OPTIMIZATION SYSTEM AND METHOD

[75] Inventors: Richard J. Klein, II; Douglas L. Sevey, both of Waterloo; Alireza Badakhshan; Ricky J. Bauer, both of Cedar Falls, all of Iowa

[73] Assignee: University of Northern Iowa Foundation, Cedar Falls, Iowa

[21] Appl. No.: 504,370

[22] Filed: Jul. 19, 1995

[51] Int. Cl.[6] .............................. G01C 3/00; G01C 5/00

[52] U.S. Cl. .............................. 239/1; 239/289; 356/3.1

[58] Field of Search .......................... 356/370, 3.1, 3.11, 356/3.12; 239/71, 289, DIG. 14, 1

[56] References Cited

U.S. PATENT DOCUMENTS

| | | | |
|---|---|---|---|
| 2,532,104 | 11/1950 | King | 356/3.1 |
| 2,629,516 | 2/1953 | Badham | 239/289 X |
| 3,117,480 | 1/1964 | Peddinghaus | 356/3.1 X |
| 3,731,743 | 5/1973 | Marshall | 169/2 R |
| 4,291,839 | 9/1981 | Brett | 239/289 |
| 4,556,815 | 12/1985 | Ohhashi et al. | 310/338 |
| 4,614,300 | 9/1986 | Falcoff | 239/71 |
| 4,702,931 | 10/1987 | Falcoff | 427/10 |
| 4,922,852 | 5/1990 | Price | 118/683 |
| 4,982,897 | 1/1991 | Matusita et al. | 239/71 |
| 5,152,841 | 10/1992 | Medler et al. | 118/704 |
| 5,160,086 | 11/1992 | Kuykendal et al. | 239/18 |

FOREIGN PATENT DOCUMENTS

| | | | |
|---|---|---|---|
| 5-154422 | 6/1993 | Japan | 239/289 |

*Primary Examiner*—Kevin Weldon
*Attorney, Agent, or Firm*—Andrus, Sceales, Starke & Sawall

[57] ABSTRACT

An optical spray paint optimization system can be removably mounted to a spray paint gun, thus enhancing the ability of the user to guide the direction of the spray and also locate the nozzle at an optimum spray distance from the surface being painted. The preferred apparatus uses a diode laser, a beam splitter and a reflecting mirror to generate a reference beam and a gauge beam. The reference beam propagates in a fixed forward direction, but the direction of the gauge beam is adjustable by adjusting the attitude of the reflecting mirror. The reference beam and the gauge beam intersect at a convergence point which can be repositioned to a selected distance from the nozzle of the spray painting system by adjusting the path of the gauge beam, thus allowing the user to spray at the optimum spray distance by locating the convergence point on the surface being painted. The beams also aid in aiming the spray.

12 Claims, 2 Drawing Sheets

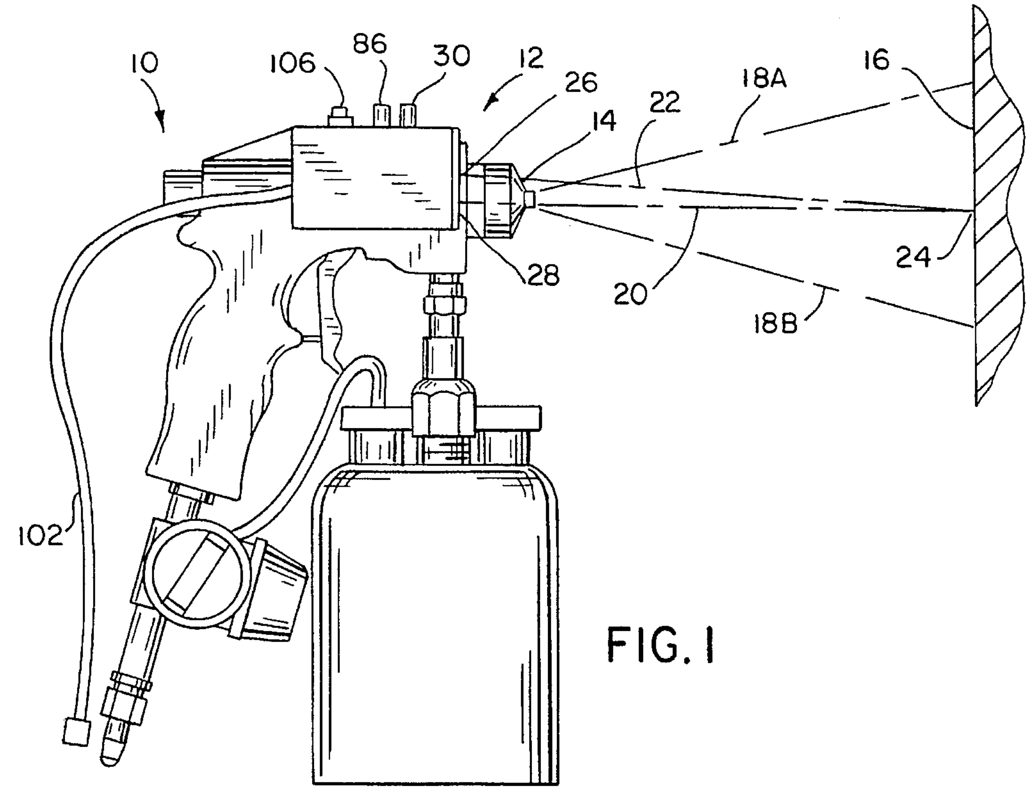
FIG. 1
FIG. 2
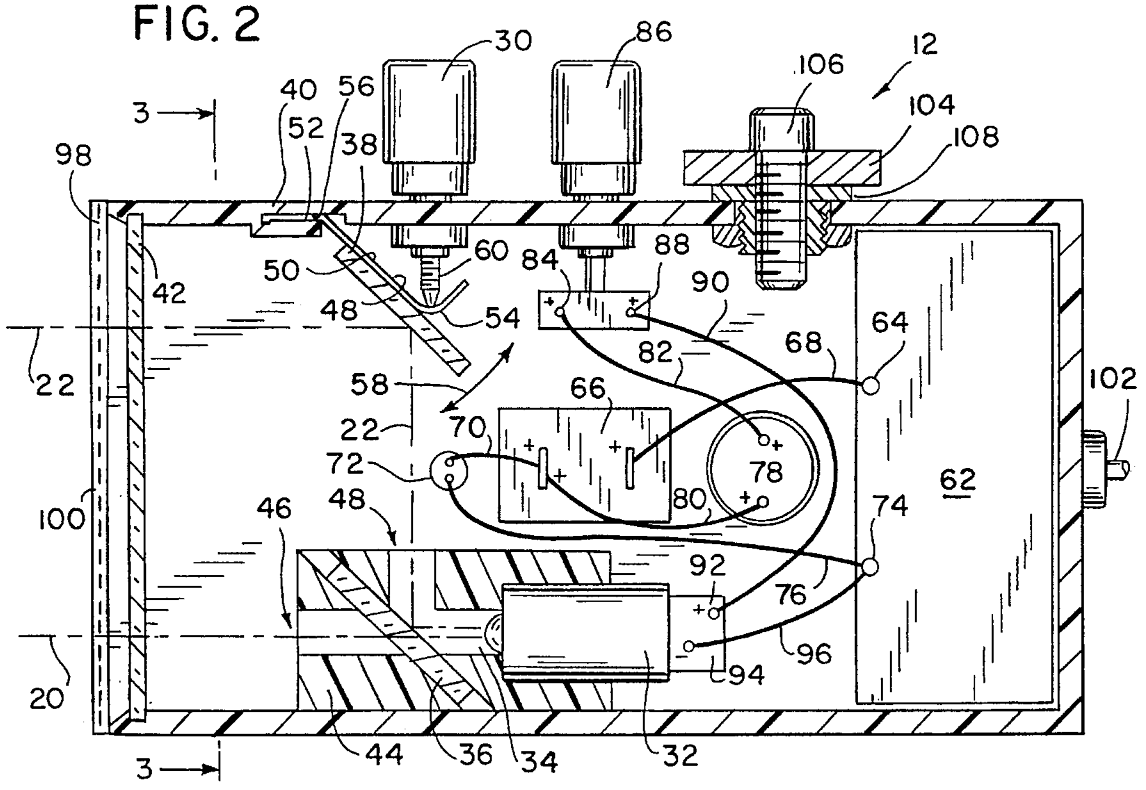

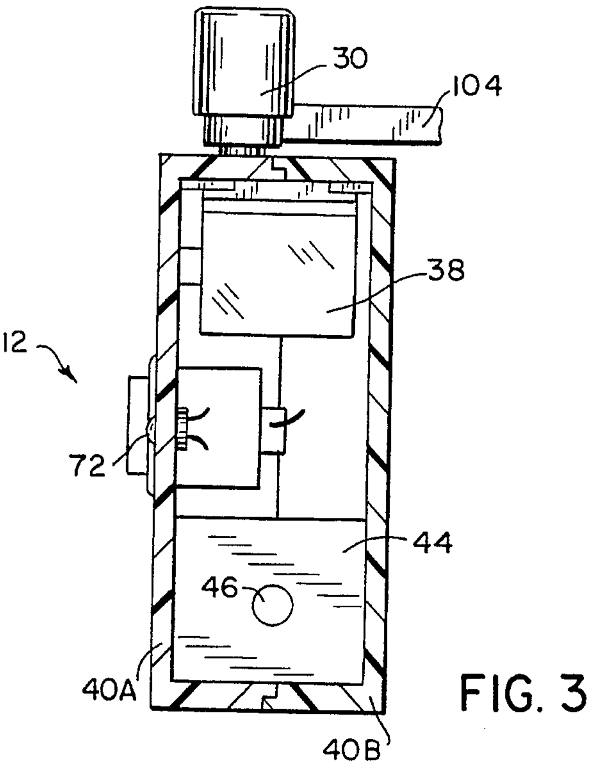
FIG. 3
FIG. 4
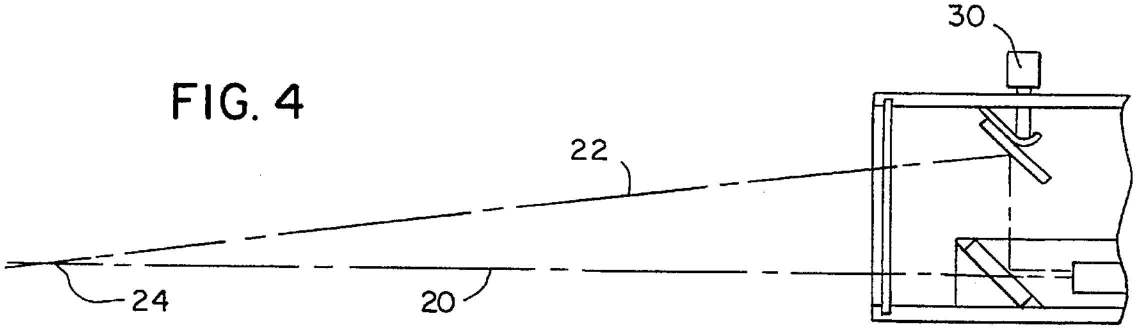
FIG. 5
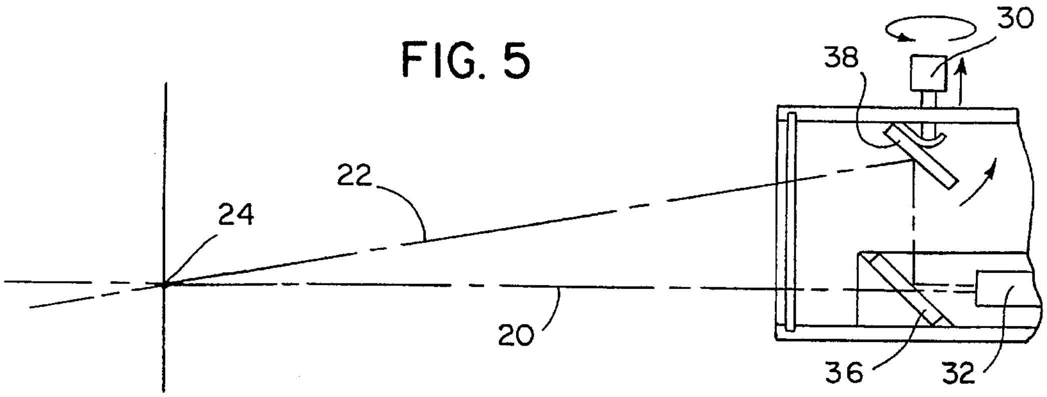

OPTICAL SPRAY PAINT OPTIMIZATION SYSTEM AND METHOD

FIELD OF THE INVENTION

The invention relates to spray painting systems, and in particular to an optical spray painting optimization system that can improve paint transfer efficiency and reduce paint waste.

BACKGROUND OF THE INVENTION

Spray paint guns spray paint from a nozzle with compressed air onto a surface being painted. In order to optimize the quality of the finish of the painted surface, it is important that the nozzle not be placed too close to the surface being painted. Placing the nozzle too close to the surface can cause an uneven wet film build as well as runs. It is generally desired that the coat of paint on the surface have uniform thickness at a thickness sufficient for complete coverage of the surface. The quality and uniformity of the paint coverage typically improves as the distance between the spray nozzle and the surface being painted increases.

It is also not desirable that the spray distance between the nozzle and the surface being painted be substantially larger than an optimum spray distance. Letting the spray distance be too large can cause overspray, paint fogging, or otherwise decrease the efficiency of paint transfer onto the surface being painted. Having the nozzle too far from the surface being painted not only increases the number of coats necessary to provide a sufficient wet film build for proper paint coverage, but also increases the cost of complying with environmental regulations. High levels of overspray and fogging increases the amount of volatile organic compounds that can escape from spray painting booths, and also increase the amount of hazardous waste that must be disposed of from spray paint system air filtering systems.

Depending on the type of spray painting system being used (e.g. conventional compressed-air system, electrostatic system, etc.), the type of paint being used, and possibly other factors, the optimum distance between the nozzle and the surface being painted varies. Several manufacturers and others in the industry have published data on what is believed to be the optimum spray distance based on a variety of factors. Even with knowledge of the optimum spray distances under each of the various conditions, it can be difficult for a person using a spray gun to keep the distance between the nozzle and the surface being painted at the optimum spray distance. This is especially difficult for novices.

It is generally believed in the spray paint industry that the optimum spray distance should be such that a fifty—fifty overlap of successive paths of spray paint provide sufficient wet film build for proper paint coverage. For novices and sometimes even experienced spray painters, it is difficult to maintain the proper spray pattern to obtain a concise fifty—fifty overlap, especially while trying to maintain the proper spray distance.

SUMMARY OF THE INVENTION

The invention uses optics, and in particular intersecting light beams, to gauge the distance of the spray nozzle from the surface being painted and to also properly align successive paths of spray paint layers to effectively accomplish the desired fifty—fifty overlap. The invention therefore enhances the ability of both novice and experienced paint sprayers to achieve even wet film build while at the same time reducing the inefficiencies and environmental cost created by positioning the spray nozzle too far from the surface being painted.

The invention is an optical spray paint optimization system that can be removably mounted to a spray painting system such as a spray painting gun or the like. The invention can be used with conventional spray painting systems using compressed air, and also other types of systems including those relying on electrostatics.

The optical system has a laser, preferably a diode laser, that generates a beam. The beam from the laser is split by a beam splitter into a reference beam and a gauge beam. The reference beam propagates from the beam splitter in a forward direction, preferably the same direction as the beam emitted from the laser. The gauge beam propagates from the beam splitter towards an adjustable reflecting mirror. It is preferred that the direction of propagation of the gauge beam from the beam splitter, i.e. the splitting direction, be perpendicular to the forward direction in which the reference beam propagates. After the gauge beam is reflected by the adjustable minor, the reflected gauge beam propagates from the mirror and intersects with the reference beam at a convergence point. The distance of the convergence point along the reference beam can be adjusted by changing the attitude of the reflecting mirror. It is preferred that a control knob for the adjustable reflecting mirror be calibrated so that the convergence point can be easily positioned at a selected distance from the nozzle of the spray painting system. The user of the spray painting system can therefore maintain the nozzle at the proper spray distance from the surface being painted by locating the convergence point on the surface being painted.

It is preferred that the illumination location of the reference beam on the surface being painted be located along the midwidth of the path that the nozzle will be aimed during painting, that is, the reference beam should be located in a horizontal plane through the center of the nozzle if it is anticipated to spray paint in successive horizontal paths along the surface. With this configuration, the user can spray a first layer of paint along the first path and then spray a second layer of paint along a second path while having the illumination point of the reference beam lined up with the edge of the first path. In this manner, the user, whether a novice or an expert, can accomplish a relatively precise fifty—fifty overlap. The invention is not only an aid to novice and expert spray painters, but can also be used as a training device to teach proper spray painting techniques. The invention can also be used to target small parts, thus reducing the amount of paint needed to cover the parts.

The preferred system includes an adjustable power intensity switch which adjusts the amount of power transmitted to the laser, thus adjusting the intensity of the beam emitted form the laser. This feature is useful because the beams interact differently with different colors and types of paints and surfaces.

The preferred embodiment of the invention is a battery powered unit attached to a hand-held spray painting gun. A motion detector switch is provided to interrupt power from the battery to the laser system when the spray gun is not in use.

Other features and advantages of the invention should be apparent upon inspecting the drawings, the following description of the drawings and claims.

BRIEF DESCRIPTION OF THE DRAWINGS

FIG. 1 is a side elevational view of a spray painting system having an optical spray paint optimization system as in accordance with the invention.

FIG. 2 is a sectional view showing the internal components of the optical spray paint optimization system.

FIG. 3 is a view taken along lines 3—3 in FIG. 2.

FIG. 4 is a schematic view illustrating a laser beam convergence point at a selected distance from a nozzle of the spray painting system shown in FIG. 1.

FIG. 5 is a schematic drawing similar to FIG. 4 illustrating that the distance of the convergence point from the nozzle can be changed by adjusting the attitude of an adjustable reflecting mirror.

DETAILED DESCRIPTION OF THE DRAWINGS

FIG. 1 illustrates a hand-held spray painting gun 10 having an optical spray paint optimization system 12 mounted to a side of the gun 10 in accordance with the preferred embodiment of the invention. The gun 10 uses compressed air to spray paint from nozzle 14 onto a surface or an object being painted, such as wall surface 16. The spray of paint from nozzle 14 is illustrated in FIG. 1 by lines 18*a* and 18*b*.

The optical paint optimization unit 12 emits two converging laser beams: a reference beam 20 and a gauge beam 22. It is preferred that the optical unit 12 be mounted to the gun 10 such that the reference beam 20 propagates in the same forward direction as defined generally by the spray coming from the nozzle 14. In other words, the reference beam 20 should propagate in the same forward direction that the gun 10 is aimed. The reference beam 20 illuminates the wall surface 16 at an illumination location. The gauge beam 22 is emitted from the optical unit 12 at a location 26 that is off-set from the location 28 where the reference beam 20 is emitted from the unit 12. The gauge beam 22 propagates from the unit 12 and intersects the reference beam 20 at a convergence point illustrated in FIG. 1 to be at the same location as the illumination location 24.

A control knob 30 located on top of the optical unit 12 adjusts the direction that the gauge beam 22 propagates, thereby moving the location of the convergence point 24, i.e. the location where the gauge beam 22 intersects the reference beam 20. The control knob 30 is preferably calibrated so that a user can easily select the distance or the convergence point 24 from the unit 12 along reference beam 20. In this manner, a user can preselect a desired spray distance, and can maintain the nozzle 14 from the surface 16 at the preselected spray distance by locating the convergence point 24 on the surface 16. If the control knob 30 has been properly adjusted for the conditions (i.e. type of paint, type or surface, etc.) and the nozzle 14 of the gun 10 has been maintained at an appropriate spray distance to locate the convergence point 24 on the surface 16, the paint transfer efficiency should be optimized.

As a user moves the gun 10, the spray of paint 18*a* and 18*b* coats the surface 16 along a path. The illumination location 24, which is the same as the convergence point 24 when the spray gun 10 is being used at the preselected spray distance, is located roughly in the center of the path that will be painted. In the preferred embodiment, the reference beam 20 is located in a horizontal plane through the center of the nozzle 14, which is appropriate when painting successive horizontal coats of paint on surface 16. The illumination location 24 is thus useful for obtaining a concise fifty—fifty overlap. To do this, a user can spray a successive layer of paint along a path defined by aligning the illumination location 24 of the reference beam 20 on a surface 16 along the edge of the previous path of paint. The illumination location 24 is also useful for targeting small objects.

FIGS. 2 and 3 show the optical unit 12 in more detail. The optical unit 12 has a diode laser 32 which emits a laser beam 34. The laser beam 34 propagates towards a beam splitter 36 in a fixed forward direction. The beam splitter 36 is in a fixed position within the unit 12 as is the diode laser 32. Beam splitter 36 is a fifty—fifty beam splitter. The reference beam 20 propagates from the beam splitter 36 in the same fixed forward direction as the beam 34 emitted from the laser 32. The beam splitter 36 is positioned at a 45° angle to the beam 34 emitted from the laser 32, and thus the split beam which becomes the gauge beam 22 propagates from the beam splitter 36 at a 90° angle from the reference beam 20.

The split beam from the beam splitter 36 propagates towards an adjustable reflecting mirror 38. The adjustable mirror 38 reflects the gauge beam 22 so that the reflected gauge beam 22 propagates from the adjustable mirror 38 in a plane that includes both the direction in which the reference beam 20 propagates and the splitting direction in which the gauge beam 22 propagates towards the reflecting mirror 38.

The components of the optical unit 12 are mounted to or within an injection molded plastic housing 40 having a window 42 through which the reference beam 20 and the gage beam 22 pass. An integral plastic support 44 maintains the laser diode 32 and the beam splitter 36 in a fixed position. The support has tunnels 46 and 48 to allow the propagation of the laser beams 20 and 22. The housing 40 can be made out of two parts 40*a* and 40*b*, FIG. 3, if desired.

Reflecting mirror 38 is mounted to a spring plate 48. The spring plate 48 is preferably a resilient metal plate having a mounting section 50, an attachment foot 52 and a grip cup 54. The attachment foot 52 is secured within a slot 56 in the housing 40. The plate 48 bends between the attachment foot 52 and the mounting portion 50. The mounting portion 50 extends inward from the housing slot 56 at approximately a 45° angle to the preferred splitting direction of the gauge beam 22 from the beam splitter 36. The flat reflecting mirror 38 is mounted to the mounting portion 50, and is likewise positioned at roughly a 45° angle to the splitting direction.

The grip cup 54 of the spring plate 48 is located at the end of the mounting portion 50. The precise direction of the mirror 38 can be adjusted as depicted by arrow 58 by turning control knob 30. The control knob 30 communicates with a threaded control pin 60 that engages the grip cup 54 of the spring plate 48. The spring plate 48 is tensioned to move towards the control knob 30 absent an obstructing surface by control pin 60. When the control knob 30 is turned in the clockwise direction, the control pin 60 retracts thus repositioning the mirror 38 so that the gauge beam 22 is reflected at a sharper angle. In other words, turning the control knob in the clockwise direction moves the convergence point 24 of the reference beam 20 and the gauge beam 22 to a location closer to the unit 12 (see FIGS. 4 and 5).

Referring still to FIGS. 2 and 3, the diode laser 32 is powered by electrical power stored in a battery 62 located within the housing 40. The power to the diode laser 32 is intensity adjusted in the preferred embodiment as is now described. A positive terminal 64 of the battery 62 is electrically connected to a switch 66 by wire 68. The switch 66 is the on-off switch for the unit 12. When switch 66 is closed, electrical power is transmitted through wire 70 to an LED indicator light 72 which lights up to let the user know the switch 66 is located in the on position. The negative side of the LED indicator light 72 is connected directly to a negative terminal 74 of the battery 62 through wire 76.

When switch 66 is closed, electrical power is also transmitted to a motion detector switch 78 through wire 80. If the motion detector switch 78 detects motion, an internal switch in the motion detector switch 78 remains closed thus allowing electrical power to transmit through wire 82 to an input terminal 84 on an intensity control switch 86. If the motion detector 78 does not detect motion for a certain desired period of time (e.g. one minute), the internal switch in the motion detector switch 78 will open, thus conserving battery power when the unit 12 is not in operation.

The power intensity switch 86 can be turned to adjust the intensity of the power transmitted from an output terminal 88 of the intensity control switch. The intensity adjust electrical power from the power intensity switch 88 is transmitted through wire 90 to a positive terminal 92 of the diode laser 32. The negative terminal 94 of the laser 32 is connected directly to the negative terminal 74 of the battery by wire 96. The intensity of the laser beam 34 emitted from the laser diode 32 can thus be adjusted by turning the power intensity switch 86. This can be important because, depending on the intensity of the beams from the laser 32, the beams can interact differently with different colors and types of paints and types of surfaces.

In order to maintain the integrity of the beams 20 and 22 passing through the window 42, it can be important that paint mist be prevented from accumulating on the window 42. Referring in particular to FIGS. 1 and 2, the preferred embodiment of the invention provides an air curtain that blows in front of the window 42 to shelter the window 42 from paint mist. The air curtain is provided through an air curtain tube 98 which is located slightly forward of the window 42 and extends generally along an edge of the window 42. The air curtain tube 98 is a small diameter tube having a line of perforations 100 along the length of the tube 98 which are air outlets for discharging the curtain of air. A flow of air from an air source is supplied to the air curtain tube 98 through an air hose 102 which is attached to the unit 12.

The unit 12 is mounted to the gun 10 by securing the unit 12 to a bracket 104 that is attached to the gun 10 with a screw or bolt 106. A threaded fitting 108 can be fixed within an opening in the wall of the housing 40 to provide a secure mounting arrangement.

It should be recognized that various equivalents, camel alternatives and modifications of the invention are possible and should be considered to be within the scope of the following claims.

We claim:

1. In a spray painting system having a nozzle from which paint is sprayed onto a surface, an optical spray paint optimization system comprising:

a laser that generates an emitted beam;

a beam splitter that splits the emitted beam into a reference beam and a gauge beam; and an adjustable mirror that reflects the gauge beam so that the gauge beam and the reference beam converge at a convergence point positioned at a selected distance from the nozzle of the spray painting system.

2. The invention as recited in claim 1 wherein the illumination location of the reference beam on the surface is located roughly in the midwidth of the path that the nozzle will be aimed during painting.

3. The invention as recited in claim 2 wherein the reference beam is located in a horizontal plane through the center of the nozzle.

4. The invention as recited in claim 1 wherein:

the emitted beam from the laser propagates in a forward direction;

the reference beam propagates from the beam splitter in the forward direction;

the gauge beam propagates from the beam splitter towards the adjustable reflecting mirror at a splitting direction which is perpendicular to the forward direction; and the reflected gauge beam propagates from the adjustable reflecting mirror in a plane including both the forward direction and the splitting direction.

5. The invention as recited in claim 1 further comprising:

an adjustable power intensity switch that receives electrical power from a power source and transmits intensity adjusted electrical power to the laser thereby adjusting the intensity of the emitted beam.

6. The invention as recited in claim 1 wherein the laser is powered by direct current electrical power and the optical spray paint optimization system futher comprises:

a motion detector switch that interrupts electrical power to the laser when the system has not been in motion for a period of time.

7. The invention as recited in claim 1 further comprising a control knob that can be adjusted to change the attitude of the reflecting mirror and thereby change the selected distance of the convergence point from the nozzle.

8. The invention as recited in claim 1 wherein the optical spray paint optimization system further comprises a container holding the laser, the beam splitter and the adjustable reflecting mirror, and wherein the container is removably mounted to the remainder of the paint spraying system in a fixed position relative to the nozzle.

9. The invention as recited in claim 1 wherein the reference beam passes through a window while propagating towards the convergence point, and the gauge beam also passes through the window while propagating from the reflecting mirror towards the convergence point, and the invention further comprises:

an air hose for receiving a flow of air from an air source; and an air curtain tube located slightly forward of the window and extending generally along an edge of the window, the tube receiving air from the air hose and having one or more air outlets along the length of the tube through which a curtain of air is discharged to shelter the window from paint mists.

10. In a spray painting system having a nozzle from which paint is sprayed onto a surface being painted, a method of positioning the nozzle at a proper spray distance from the surface comprising the steps of:

propagating a reference beam in a fixed direction;

intersecting the propagated reference beam with a gauge beam propagated in an adjustable direction to form a convergence point;

locating the nozzle at a spray distance from the surface being painted so that the convergence point is illuminated on the surface.

11. The method as recited in claim 10 further comprising the step of:

adjusting the position of the convergence point along the reference beam by adjusting the direction in which the gauge beam is propagated by a selected amount.

12. The method as recited in claim 10 further comprising the step of:

aligning the reference beam so that the fixed forward direction in which the reference beam is propagated is located roughly in the center of a path that the nozzle will be aimed when a surface is painted;

painting a first layer of paint along a first path; and spraying a second layer of paint along a second path defined by aligning the illumination location of the reference beam on the surface being painted along the edge of the first path of paint.

* * * * *

UNITED STATES PATENT AND TRADEMARK OFFICE
CERTIFICATE OF CORRECTION

PATENT NO. : 5,598,972

DATED : February 4, 1997

INVENTOR(S) : RICHARD J. KLEIN, II ET AL

It is certified that error appears in the above-identified patent and that said Letters Patent is hereby corrected as shown below:

On the title page, item:

[56] References Cited, add: -- U.S. Patent 4,444,495, 4/1984, Bramwell et al; Foreign Patents 06163499, 6/1994, Japan; 3148293, 2/1984, Germany; 0007207, 1/1980, Europe --.

Signed and Sealed this

Twentieth Day of May, 1997

*Attest:*

Bruce Lehman

BRUCE LEHMAN

*Attesting Officer*

*Commissioner of Patents and Trademarks*